United States Patent [19]

Kort et al.

[11] Patent Number: 5,533,751
[45] Date of Patent: Jul. 9, 1996

[54] HYBRID INFLATOR WITH ELONGATED HOUSING AND CENTER DISCHARGE

[75] Inventors: Leland B. Kort, Lakewood, Colo.; Walter A. Moore, Ogden, Utah; Randall J. Clark, Pleasant View, Utah; Kelly B. Johnson, Layton, Utah; L. John Pierotti, Huntsville, Utah; Brett Hussey, Bountiful, Utah

[73] Assignee: Morton International, Inc., Chicago, Ill.

[21] Appl. No.: 423,261

[22] Filed: Apr. 17, 1995

Related U.S. Application Data

[63] Continuation of Ser. No. 394,254, Feb. 22, 1995, abandoned.

[51] Int. Cl.$^6$ ........................................... B60R 21/26
[52] U.S. Cl. ............................................ 280/737; 280/741
[58] Field of Search .................................. 280/737, 741, 280/736, 742; 222/3, 5

[56] References Cited

U.S. PATENT DOCUMENTS

| | | | |
|---|---|---|---|
| 3,117,424 | 1/1964 | Hebenstreit | 222/3 |
| 3,163,014 | 12/1964 | Wismar | 222/3 |
| 3,663,036 | 5/1972 | Johnson | 222/5 |
| 3,895,821 | 7/1975 | Schottheofer et al. | 280/741 |
| 4,131,300 | 12/1978 | Radke et al. | 280/737 |
| 4,512,355 | 4/1985 | Galbraith | 222/5 |
| 4,989,515 | 2/1991 | Kelly et al. | 102/202.9 |
| 5,230,532 | 7/1993 | Blumenthal et al. | 280/741 |
| 5,301,978 | 4/1994 | Münzel et al. | 280/737 |
| 5,411,290 | 5/1995 | Chan et al. | 280/737 |

*Primary Examiner*—Karin L. Tyson
*Attorney, Agent, or Firm*—George W. Rauchfuss, Jr.; Gerald K. White

[57] ABSTRACT

A hybrid inflator for an inflatable restraint system has a center frame and two tubular end caps forming an elongated housing defining a chamber storing pressurized inert gas. Unit means for heating and delivering the stored gas are mounted in the center frame and positioned to deliver inflation gasses centrally with respect to the elongated housing. In a two unit embodiment, one unit includes a squib and a pyrotechnic gas generant, and the other unit defines an outlet orifice and baffle plate. In another two unit embodiment, the second unit includes an essentially non gas-producing heating composition which, when activated, heats and expands the pressurized gas. In a third embodiment, a unit includes heating material and ignition means and defines the outlet orifice. The center manifold is extruded metal stock with two opposing flat surfaces adapted to mount one or more units.

26 Claims, 4 Drawing Sheets

HYBRID INFLATOR WITH ELONGATED HOUSING AND CENTER DISCHARGE

RELATED APPLICATION

This application is a continuation of application Ser. No. 08/394,254 filed Feb. 22, 1995, now abandoned.

FIELD OF THE INVENTION

This invention relates to hybrid inflators for vehicle occupant restraint systems and particularly to hybrid inflators having an elongated housing and central inflation gas delivery which adapts to the requirements of various installations.

BACKGROUND OF INVENTION

Inflatable restraint systems utilizing an airbag and inflator are widely accepted in all types of vehicles. Vehicles have differing characteristics; for example, vehicles differ in the size and configuration of their dashboards or other mounting points for inflatable restraint systems, vehicles differ in the distance between the dash and an occupant of the vehicle, and vehicles differ in the width or height for which airbag protection is desired. Vehicles further differ in their structural response to crashes and in the sensor input provided to the inflators. These differences create variables in the restraint system, such as the shape and volume of the airbag and the desired speed of its deployment. Those variables in turn create different requirements of inflators supplying inflation gas to the bags. Some of these requirements have been addressed by hybrid inflators, which utilize a combination of stored compressed gas and a pyrotechnic gas generant material. The pyrotechnic gas generant provides some of the inflation gasses and also heats and expands the stored gas to enhance its contribution to inflating the bag.

The size of a hybrid inflator is in part determined by the volume of stored compressed gas, as well as the configuration and content of the pyrotechnic gas generant component. It further depends upon the volume of screen and filtering material required to trap particles and hot debris resultant from operation of a pyrotechnic gas generant system, as it is undesirable to introduce hot particles of burning gas generant and inflator debris into the expanding airbag. Further, passenger side hybrid inflators deliver gas from the end of an elongated housing, which detracts from even inflation of an airbag.

With due consideration for the aforementioned requirements of occupant restraint systems, it is desirable to decrease the size, weight and complexity of the inflators, and to provide for efficient delivery of inflation gas to airbags. It is further desirable to be able to adjust the performance parameters of inflators by building on established research, development and manufacturing capability.

SUMMARY OF THE INVENTION

Accordingly, it is a principal object of the invention herein to provide a hybrid inflator for inflatable restraint systems.

It is also a principal object of the invention to provide a hybrid inflator which is simple to mount and promotes symmetric deployment of an airbag.

Another object of the invention herein is to provide a hybrid inflator which is readily adapted to the requirements of inflatable restraint systems in different vehicles.

An additional object of the invention herein is to provide a hybrid inflator which is readily adapted to use with airbags of varying volume.

A further object of the invention herein is to provide a hybrid inflator which utilizes common parts and manufacturing techniques in multiple embodiments.

In accomplishing these and other objects of the invention herein, there is provided a hybrid inflator comprising a center frame having a circumferential sidewall defining a longitudinal opening, the circumferential sidewall having first and second ends each perpendicular to the axis of the longitudinal center opening. A pair of formed end caps each has an open and a closed end, and the open ends of the end caps are respectively joined to the first and second ends of the center frame surrounding the longitudinal opening therein. One end cap may be integral with the center frame. Thus, the center frame and formed end caps together comprise an elongated housing defining a chamber for storing a pressurized inert gas of the hybrid inflator.

According to one aspect of the invention herein, the formed end caps have tubular sidewalls the length of which is selected to provide the desired volume of stored inert gas. According to another aspect of the invention, one end cap is a one piece construction with the center frame.

The center frame mounts at least one unit including heat generation means of the hybrid inflator and outlet means for delivering the inflation gasses. More particularly, the at least one unit is mounted through the circumferential sidewall of the center frame, the unit including ignitor means, and ignitable heat producing materials, and defining an outlet orifice for delivering inflation gas.

According to one aspect of the invention, the at least one unit includes an ignitor unit having a pyrotechnic gas generant therein, and the center frame further mounts a baffle cup unit defining an outlet plenum and outlet orifice covered by a rupturable seal. The ignitor unit expels gas generant gasses against the bottom of the baffle cup unit defining the outlet plenum, and the plenum inlet openings are on the periphery of the baffle cup unit, away from the stream of generant gasses. This provides mixing of the hot products of combustion of the gas generant with the inert gas, and a relatively clean flow of the combined inflation gasses.

According to other aspects of the invention, the central frame mounts an ignitor unit and also mounts a heating unit containing an essentially non gas-producing heating composition and defining an outlet orifice from the inflator covered by a rupturable seal. This ignitor unit activates the heating composition, which includes flow passages leading to the outlet orifice. The inert gasses are heated and expanded as they flow through the activated heating composition. Suitable essentially non gas-producing heating composition include thermite.

According to additional aspects of the invention, an ignitor unit also contains an essentially non gas-producing heating composition having flow passages to an exit opening. These further aspects of the invention also include means establishing early flow through the heating composition, by mechanically or explosively rupturing seals.

According to further aspects of the invention, the center frame is fabricated by extrusion and by cutting a frame of desired length from extruded stock. The circumferential sidewall of the extruded frame includes at least one flat exterior surface for mounting a unit therethrough, and preferably includes two opposed flat exterior surfaces for mounting two units therethrough.

3

The various features of novelty which characterize the invention are pointed out with particularity in the claims annexed to and forming part of this specification. For a fuller understanding of the invention, its operating advantages and specific objects attained by its use, reference is made to the accompanying drawings and descriptive matter in which the preferred embodiments are illustrated.

BRIEF DESCRIPTION OF THE DRAWINGS

The same reference numerals refer to the same elements throughout the various figures.

DESCRIPTION OF PREFERRED EMBODIMENTS

With references to FIGS. 1–5, a hybrid inflator 10 according to the invention herein has an elongated housing 11 generally comprising a center frame 12 having end caps 14 and 16 secured thereto. An ignitor unit 18 is mounted in an opening in the center frame 12, and a baffle cup unit 20 is mounted in another, opposed opening in the center frame 12. The baffle cup unit 20 defines an outlet orifice 22 which is covered by a rupturable seal 24, and a diffuser 26 is mounted to the center frame 12 above the outlet orifice. A chamber 28 is defined within the elongated housing 11 by the center frame 12 and the end caps 14 and 16, and chamber 28 is filled with an inert gas, such as Nitrogen or Argon, under pressure. The pressures are typically in the range of 2,000 to 4,000 psi, as is known for hybrid inflators.

Figures 1, 2, 3:
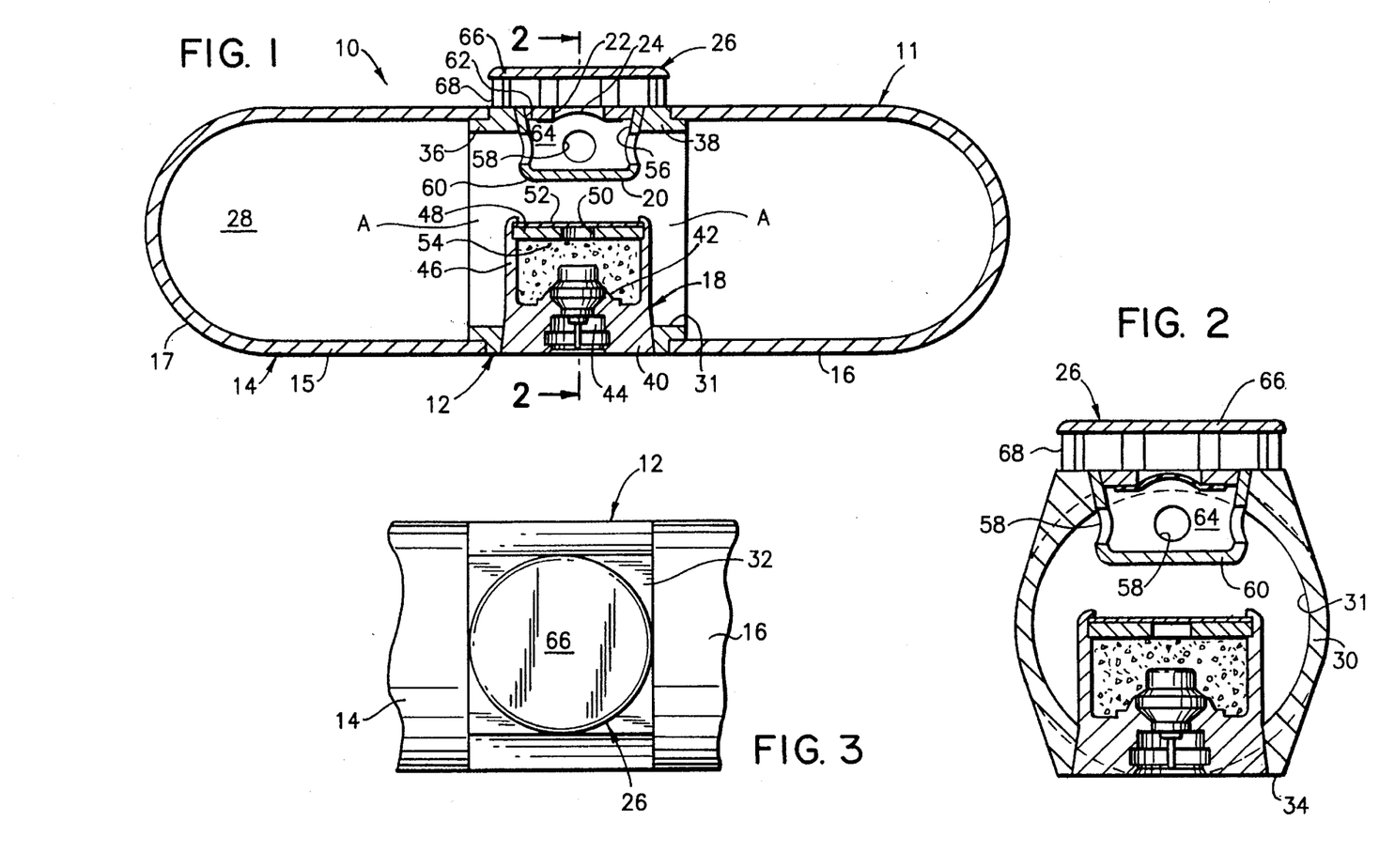
FIG. 1 is a longitudinal sectional view of a hybrid inflator according to the invention herein.
FIG. 2 is a cross-sectional view of the hybrid inflator of FIG. 1, taken along the lines 2—2 of FIG. 1.
FIG. 3 is a top fragmentary view of the hybrid inflator of FIG. 1.
Figure 5:
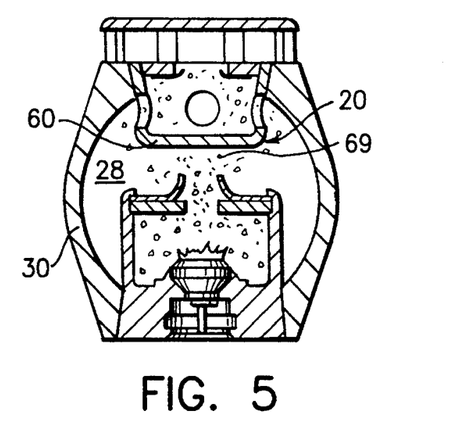
FIG. 5 is a cross-sectional view of the hybrid inflator of FIG. 1, similar to FIG. 2, with the inflator in operation.

The center frame 12 has a linearly uniform cross-section about a longitudinal axis A—A, with the cross-section best seen in FIGS. 2 and 5. The center frame is preferably formed by stamping extrusion or a combination of these with milled finishing. Thus, a plurality of center frames of desired length can be cut from prepared stock, with a minimum of fabrication and finishing for each individual frame.

The center frame 12 has a circumferential sidewall 30 surrounding a longitudinal center opening 31 having a substantially uniform diameter along the linearly uniform cross-section. The exterior of sidewall 30 defines flat top and bottom surfaces 32 and 34, respectively. The ends 36, 38 of the center frame 12 are machined to define integral annular flanges, but may be provided as flat surfaces as well. The ends 36, 38 are perpendicular to the longitudinal axis A—A and opening 31.

End cap 14 includes a tubular sidewall 15 integral with a hemispherical end wall 17. The open end of the tubular sidewall 15 is fitted over the annular flange of frame end 36 and is welded thereto. Alternatively, if the end of the center frame is provided as a flat surface, the open end of the tubular sidewall 15 is welded directly thereto. The end cap 16 is identical to the end cap 14, and is fitted on the annular flange of frame end 38 and secured thereto by welding. It will be appreciated that the volume for stored gas is readily varied by changing the length of end caps 14 and 16, without requiring any change in the center frame 12, and that the length of the frame can also be changed for that purpose.

Figure 4:
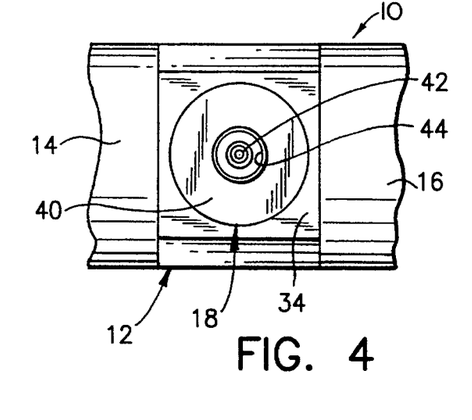
FIG. 4 is a bottom fragmentary view of the hybrid inflator of FIG. 1.

The unit 18 including ignition means is mounted through the sidewall 30 of the center frame 12, and more particularly through the flat bottom surface 34 thereof, as best seen in FIGS. 1 and 4. The ignitor unit 18 includes a base 40 which mounts an ignition squib 42. The base 40 also defines a socket opening 44 for receiving a plug with electrical leads for operating the squib 42. The ignitor unit 18 further comprises a cylindrical sidewall 46 and a top wall 48, the top wall defining an exit opening 50 covered by a rupturable seal 52. The unit 18 thereby defines a chamber containing a pyrotechnic gas generant material 54 which in this embodiment is boron potassium nitrate ($BKNO_3$). Other known pyrotechnics may also be used, as desired, including solid propellants such as polyvinyl chloride with potassium perchlorate.

The baffle cup unit 20 is also mounted through the circumferential sidewall 30 of the center frame 12, and more particularly is mounted through the flat top surface 32 opposite the ignitor unit 18. The baffle cup unit 20 has a generally cylindrical sidewall 56 in which a plurality of openings 58 are evenly spaced about the circumference. The baffle cup unit further comprises a baffle plate 60 supported by the cylindrical sidewall 56 above the exit opening 50 of the ignitor and gas generant unit 18. The baffle cup unit also includes a top member 62, which defines the outlet orifice 22 and supports the rupturable seal 24 covering it. The interior of the baffle cup unit comprises an outlet plenum chamber 64.

Also mounted to the center frame 12 is the diffuser 26 and, as best seen in FIGS. 2, 3 and 5, the diffuser is also mounted to the flat top surface 32 of the center frame. The diffuser comprises a top panel 66 supported above the outlet orifice 22 by spacer legs 68. The legs 68 are secured to the frame 12 by welding. A screen filter, not shown, may be deployed in the diffuser.

It will be appreciated by those skilled in the art that the hybrid inflator 10 is used by mounting it in a reaction can having an airbag associated therewith, such that inflation gasses exiting the outlet orifice 22 and diffuser 26 are directed to the interior of the airbag. It will also be appreciated by those skilled in the art that one may mount the hybrid inflator 10 in any desired way for introducing inflation gasses into an airbag, consistent with the invention herein; however, it is a distinct advantage of the invention herein that the inflation gasses from an elongated hybrid inflator are provided from the central portion of the elongated housing, rather than from an end thereof. Thus, when the hybrid inflator is mounted in a reaction can having an airbag secured thereto, the inflation gasses may be easily directed into the central portion of the airbag inlet, to promote symmetrical inflation.

The hybrid inflator 10 operates in the following manner. An electrical impulse, derived from a crash sensor in response to a vehicle crash, is supplied to the squib 42, which operates to ignite the pyrotechnic gas generant 54. The resultant internal pressure in the ignitor unit 18 ruptures the seal 52 over exit opening 50 to release hot gasses into the gas storage chamber 28. As best seen in FIG. 5, the stream of hot gasses passing through exit opening 50 may include some products of combustion or other debris, generally indicated by the numeral 69. These products of combustion and debris are directed against the baffle plate 60 of the baffle cup unit 20 which accumulates some of them and "knocks down" others to remove them from the stream of inflation gas. The burning gas generant creates additional pressure within the chamber 28, in part by producing gaseous products of combustion and in part by heating the inert gas stored therein. The increased pressure ruptures the seal 24 to deliver a flow of inflation gasses through the outlet orifice 22, and thereby inflate an airbag.

Figure 6:
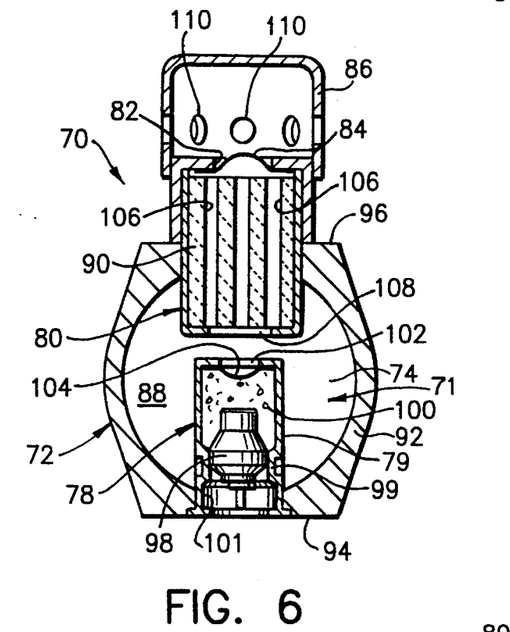
FIG. 6 is a cross-sectional view of another hybrid inflator according to the invention herein.
Figure 7:
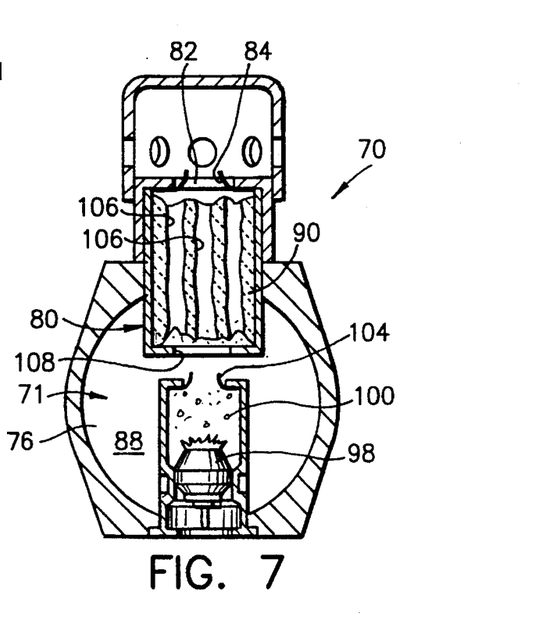
FIG. 7 is a cross-sectional view of the hybrid inflator of FIG. 6, taken in the direction opposite from the view of FIG. 6, with the inflator in operation.

With reference to FIGS. 6 and 7, another inflator 70 according to the invention herein is illustrated. It generally comprises an elongated housing 71 having a center frame 72 and tubular end caps 74 and 76. The two sectional views of FIGS. 6 and are taken in opposite directions, so that end cap 74 is seen in FIG. 6 and end cap 76 is seen in FIG. 7. The inflator 70 further generally comprises an ignitor unit 78 and a booster cup unit 80 defining an outlet orifice 82 covered by a seal 84. A diffuser 86 is mounted above the outlet orifice 84. The elongated housing 71 defines a chamber 88 for storing an inert gas, such as Nitrogen or Argon, under pressure. The inflator 70 is characterized by the booster cup unit 80 containing an essentially non gas-producing heating composition through which the stored inert gas flows, as more fully described below. The heating composition in the embodiment disclosed herein is a bound mixture of aluminum powder and powdered iron oxide, known as thermite. A burn enhancer such as potassium perchlorate may be provided.

The center frame 72 is cut from the same extruded stock as the center frame 12 described above; however, the center frame 72 may be axially shorter in view of the smaller diameter of ignitor unit 78 and booster cup unit 80, as compared to unit 18 and baffle cup unit 20 described above. The end caps 74 and 76 are tubular with integral hemispherical ends, and are attached to the center frame 72 in a manner similar to that described above with respect to center frame 12 and end caps 14 and 16.

The center frame 72 has a circumferential wall 92 with a flat bottom surface 94 and flat top surface 96. The ignitor unit 78 is generally cylindrical and is mounted in the center frame through the circumferential wall and flat bottom surface 94. The ignitor unit 78 includes a squib 98 and ignitor material 100, which in this embodiment is boron potassium nitrate ($BKNO_3$). The wall 79 of unit 78 is crimped at 99 to retain the squib, and the wall 79 forms a socket 101 for receiving a plug connector to the squib terminals. The ignitor unit 78 defines an exit opening 102 covered by a rupturable seal 104. The amount of pyrotechnic material 100 is substantially less than that of the inflator 10 described above, for the purpose set forth hereinafter.

The booster cup unit 80 is mounted through the flat top surface 96 and circumferential wall 92 of the center frame 72. The booster cup unit contains heating composition 90 having a plurality of longitudinal openings 106 formed therethrough. Alternatively, the heating composition can be provided in porous or pelletized form to provide passages, or as a solid with passage space about its exterior. All of these configurations are considered as having openings therethrough. The heating composition, upon heat activation, reacts at very high temperatures, in excess of 2000° C. The oxide/metal reaction provides its own oxygen supply, and produces heat but little or no gaseous products of combustion.

The booster cup unit defines an entrance opening 108 at the interior end thereof, such that the longitudinal openings 106 in the heating composition provide communication from the bottom opening 108 to the outlet orifice 82. The diffuser 86 is secured over the booster cup unit 80, and includes a plurality of spaced apart openings 110 for dispersing inflation gasses. Although not shown, a screen filter may be positioned within the diffuser 86.

The inflator 70 is typically mounted in a reaction can in association with an airbag, such that the inflation gasses are directed to inflating the airbag. With reference to FIG. 7, upon sensing of a vehicle crash, an electrical signal is provided to the squib 98, which operates to ignite the gas generant material 100. This causes the seal 104 to rupture, and an expulsion of hot products of combustion impinges upon the heating composition 90 through the opening 108 in the booster cup 80, thereby igniting it. The pyrotechnic and heat generating reactions also increase the pressure in the gas storage chamber 88, rupturing the seal 84 over outlet orifice 82.

Gasses exiting the inflator 70 through outlet orifice 82 pass through the passages 106 in the heating composition 90. Because the heating composition reacts at a very high temperature, the gas flowing through the heating composition is heated and expanded, with the expansion of the gas contributing to inflation of the airbag. The heating composition provides sufficient heating and expanding of the gasses, such that the amount of pyrotechnic gas generant is substantially reduced and is used primarily to initiate the reaction of the heating composition.

Figure 8:
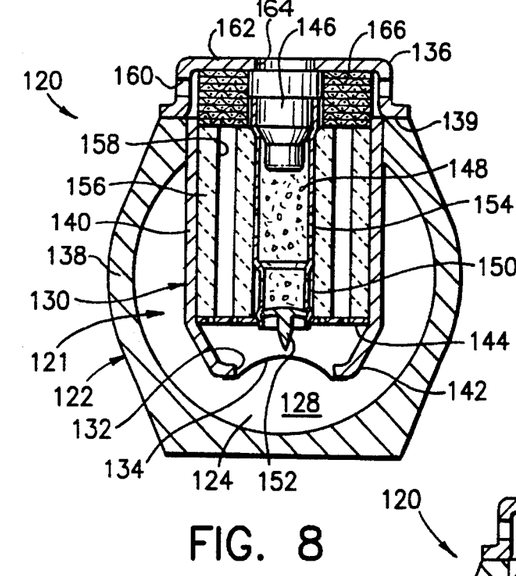
FIG. 8 is a cross-sectional view of another hybrid inflator according to the invention herein.
Figure 9:
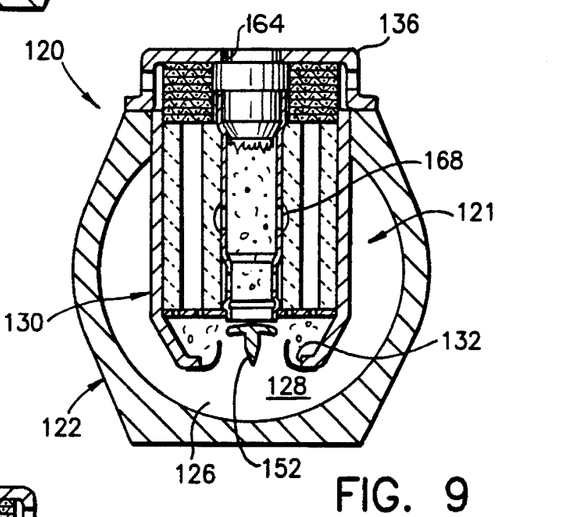
FIG. 9 is a cross-sectional view of the hybrid inflator of FIG. 8, taken in the direction opposite from the view of FIG. 8, with the inflator in operation.

FIGS. 8 and 9 illustrate another inflator 120 according to the invention herein. The inflator 120 has an elongated housing 121 generally comprised of a center frame 122 fitted with end caps 124 and 226, respectively, shown in the opposite direction views of FIG. 8 and FIG. 9, to form a gas storage chamber 128. A combined ignitor and booster unit 130 is mounted in the center frame 122 and the unit defines an outlet orifice 132 covered by a burst disk 134. The unit 130 also mounts a diffuser 136 for delivering the flow of inflation gasses to an airbag.

The center frame 122 is taken from the same extruded stock as the center frames 12 and 72 described above, and is cut to the desired axial length to accommodate the unit 130. The end caps 124, 126 and their attachment to the center frame 132 are also as described above in the other embodiments. The center frame 122 has a circumferential wall 138 and a flat top surface 139, through which the unit 130 is mounted extending into the gas storage chamber 128.

The ignitor and heating unit 130 includes a tubular sidewall 140 which tapers inwardly at its lower end 142 to define the outlet orifice 132. The rupturable burst disk 134 deployed across the outlet orifice 132 retains an inert gas such as Argon or Nitrogen within the pressure chamber 128 at a typical pressure of 2,000–4,000 psi.

An annular perforated panel 144 extends across the sidewall 140 at the transition to its lower end 142, and supports an ignition tube 150 centrally within the generant cup 140.

The ignition tube is shaped at its upper portion to receive a squib 146, and below the squib 146, the ignition tube contains a pyrotechnic 148, which is boron potassium nitrate (BKNO₃). At the lower end of the ignition tube 150, a projectile 152 is releasably engaged in the ignition tube and aimed toward the burst disk 134. The ignition tube also defines radially disposed openings 154 from the pyrotechnic 148.

The annular space between the generant cup 140 and the ignition tube 150 receives an essentially non gas-producing heating composition which, in the preferred embodiment, is thermite 156 as described above. The heating composition is provided in a tubular configuration surrounding the ignition tube 150, and has a series of longitudinal openings 158, so that gas may flow from the outlet orifice 132 through the heating composition to the diffuser 136. Also as noted above, the openings can be provided as interstices of porous material, about the exterior of a mass of bound heating composition, or the heating composition can be provided in pellet form.

The diffuser 136 is mounted to the center frame 122 above the unit 130. The diffuser 136 is generally cup-shaped and defines openings 160 in its sidewall for delivering inflation gasses. The top wall 162 of the diffuser defines opening 164 for receiving a plug connector to terminals of the squib 146. Filter screen 166 is contained within the diffuser, to remove debris from the inflation gasses.

The inflator 120 is typically mounted in a reaction can having an airbag mounted thereto, such that inflation gasses from the diffuser are delivered to the interior of the airbag. The inflator 120 operates upon receipt of an electrical impulse from a crash sensor, which fires the squib 146. The squib ignites the pyrotechnic 148 and its rapidly expanding products of combustion drive the projectile 152 downwardly to burst the diaphragm 134. The pyrotechnic gas blows through the radial openings 154 in the ignition tube and ignites the heating composition 156, as indicated at 168. The heating composition is also ignited in other areas, and particularly along the openings 158, by the products of combustion exiting the lower end of ignition tube 150. Although the pyrotechnic produces some hot gasses, its primary function is to initiate the reaction of the heating composition.

Upon rupture of the burst disk 134, the pressurized gas in storage chamber 128 flows through the outlet orifice 132 and heating composition 156, and exits the inflator through the diffuser openings 160. Because the projectile ruptures the burst disk prior to substantial heat build-up in the unit 130, the early flow of gas is somewhat "soft" and serves to initially deploy the airbag prior to the onset of rapid, heat-boosted inflation. The boosted inflation occurs when the heating composition is fully ignited, and the gas flowing therethrough is substantially heated and expanded.

Figure 10:
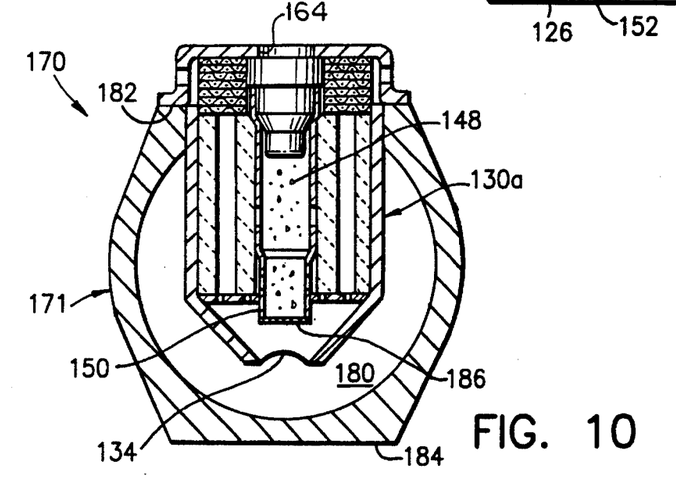
FIG. 10 is a cross-sectional view of another hybrid inflator according to the invention herein.
Figure 11:
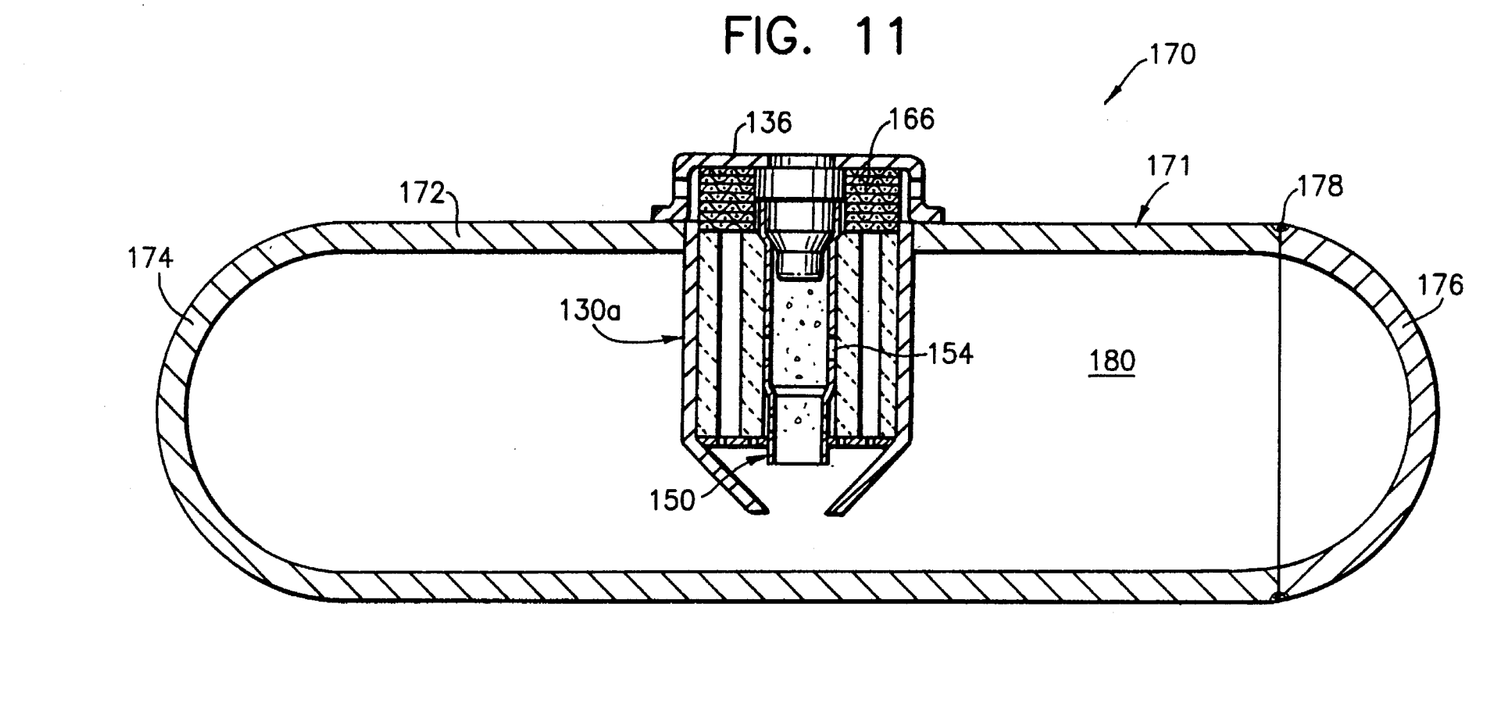
FIG. 11 is a longitudinal sectional view of the hybrid inflator of FIG. 10, with the inflator in operation.

With reference to FIGS. 10 and 11, another inflator 170 according to the invention herein is illustrated. It is characterized by an elongated housing 171 including a deep drawn center frame 172 having an integral end cap 174 and a second end wall provided by end cap 176 secured to the open end of the center frame 172 by weld 178, thereby defining a chamber 180 for storing pressurized inert gas. The center frame is preferably deep drawn with flat upper and lower surfaces 182 and 184, thereby adapting the housing to receive units, such as the ignitor and baffle cup units 18 and 20, ignitor unit 78 and booster cup unit 80, or the combined ignitor and booster unit 130. However, a housing without flat surfaces also suffices.

Inflator 170 employs a combined ignitor and booster unit 130a which is highly similar to unit 130 but is characterized by a rupturable seal 186 positioned over the end of the ignition tube 150 in place of the projectile 152 of inflator 120. Thus, the burst disk 134 is ruptured by heat and pressure generated upon ignition of the pyrotechnic 148 rather than mechanically by the projectile. FIG. 11 shows the inflator 170 after the squib has ignited the pyrotechnic 148, rupturing seal 186 and burst disc 134 and activating the heating composition through openings 154 in tube 150.

Each of the above inflators utilizes a center frame taken from common stock, and accepting end caps and units to achieve a complete, operable hybrid inflator. The desired performance characteristics of a hybrid inflator of this type are easily adjusted through selection of the volume of stored gas, by varying the length of the end caps or center frame, and selection of the unit providing the desired boost. The cross-sectional configuration of the center frame may be modified from that described above while still enjoying the benefits of the invention, as can the structural detail of the units.

Each of the inflators is also characterized by an elongated housing adapted to provide the inflation gasses from the central portion thereof, which those skilled in the art can utilize in achieving more efficient reaction cans and introduction of inflation gas to an airbag to promote symmetric inflation.

Accordingly, preferred embodiments of hybrid inflators have been described which admirably achieve the objects of the invention herein. With reference to the description of the preferred embodiments, those skilled in the art will appreciate that modifications may be made without departing from the spirit of the invention. Therefore, it is not intended that the scope of the invention be limited to the specific embodiments illustrated and described. Rather, it is intended that the scope of the invention be determined by the appended claims and equivalents thereof.

We claim:

1. A hybrid inflator for an inflatable restraint system, comprising:

A) an elongated housing having a center frame having a circumferential sidewall defining a longitudinal opening therethrough and first and second elongated tubular end caps, each end cap having an open and a closed end, the open ends of the end caps respectively secured to the center frame such that the center frame and end caps together define the outer surface of the housing and a chamber storing a pressurized inert gas;

B) at least one unit mounted through the circumferential sidewall of the center frame generally centrally in the elongated housing, the at least one unit including a unit containing a heat producing material, the unit containing the heat producing material configured and adapted to expose the heat producing material and products of combustion thereof directly to the stored gas after ignition of the heat producing material, means for igniting the heat producing material, and the at least one unit defining a rupturably-sealed outlet orifice through which inflation gas is delivered from the chamber upon operation of the hybrid inflator.

2. A hybrid inflator as defined in claim 1 wherein the first and second tubular end caps have hemispheric closed ends.

3. A hybrid inflator as defined in claim 1 wherein the center frame is extruded metal having a linearly uniform cross-sectional configuration.

4. A hybrid inflator as defined in claim 1 wherein the center frame and one end cap are a one piece construction.

5. A hybrid inflator as defined in claim 4 wherein the one piece center frame and end cap are fabricated by deep drawn metal forming.

6. A hybrid inflator as defined in claim 1 wherein the circumferential sidewall has at least one flat exterior surface, and the at least one unit is mounted through the flat exterior surface and circumferential sidewall.

7. A hybrid inflator as defined in claim 6 wherein the circumferential sidewall has two generally parallel flat exterior surfaces and the at least one unit comprises two units, one unit being mounted through each flat exterior surface of the circumferential sidewall.

8. A hybrid inflator as defined in claim 1 wherein the at least one unit comprises:
 1) an ignitor unit including the means for igniting the heat producing material in the form of a squib and the heat producing material in the form of pyrotechnic gas generant, and
 2) a baffle cup unit defining the rupturably-sealed outlet orifice from the gas storing chamber and having a solid baffle plate interposed between the outlet orifice and the ignitor unit.

9. A hybrid inflator as defined in claim 8 wherein the ignitor unit defines an exit opening for releasing products of combustion of the gas generant material, and solid the baffle plate is interposed between the exit opening and outlet orifice.

10. A hybrid inflator as defined in claim 1 wherein the at least one unit comprises:
 1) a booster cup unit defining the rupturably-sealed outlet orifice from the gas storage chamber and containing the heat producing material in the form of an essentially non gas-producing heating composition positioned in a flow path of stored gas through the booster cup unit, and
 2) an ignitor unit mounted through the circumferential sidewall of the center frame and including the means for igniting the heat producing material in the form of a squib and a pyrotechnic material, the ignitor unit configured to direct the pyrotechnic material, upon ignition thereof by the squib, toward the heating composition for initiating a heat producing reaction thereof.

11. A hybrid inflator as defined in claim 10 wherein the heating composition includes aluminum powder and powdered iron oxide.

12. A hybrid inflator as defined in claim 10 wherein the heat producing composition defines a plurality of passages through which stored gas passes in exiting the hybrid inflator.

13. A hybrid inflator as defined in claim 1 wherein the at least one unit comprises a single unit and the heat producing material is an essentially non gas-producing heating composition deployed in the flow path of inflation gas delivered through the outlet orifice.

14. A hybrid inflator as defined in claim 13 wherein the unit has an upper end mounted to the circumferential sidewall of the housing, a lower end within the housing and defining the rupturably sealed outlet orifice, whereby the stored gas flows through the outlet orifice prior to heating by the heating composition.

15. A hybrid inflator as defined in claim 14 wherein the means for initiating reaction of the heating composition includes a squib and pyrotechnic material, and wherein ignition of the pyrotechnic material is adapted to open the rupturably sealed outlet orifice.

16. A hybrid inflator as defined in claim 12 wherein the unit further includes a projectile adapted to be driven through the rupturably sealed outlet orifice upon ignition of the pyrotechnic material.

17. A hybrid inflator for an inflatable restraint system, comprising:
 A) an elongated housing comprising a center frame having a longitudinal opening therethrough and first and second elongated tubular end caps secured to the center frame, the center frame and end caps together defining a chamber for containing pressurized inert gas;
 B) a first unit containing ignitable material for heating the pressurized gas, the unit containing the ignitable material configured and adapted to expose the ignitable material and the products and heat of combustion thereof, when ignited, directly to the stored gas, the first unit mounted to the center frame of the housing generally centrally along its elongated length and extending into the chamber containing pressurized inert gas;
 C) means mounted to the center frame of the housing for igniting the ignitable material; and
 D) an outlet orifice for delivering heated inflation gas from the chamber, the outlet orifice being defined generally centrally along the elongated length of the housing to deliver inflation gas from the center frame and being rupturably sealed for containing pressurized gas in the chamber until operation of the first unit.

18. A hybrid inflator as defined in claim 17 and further comprising a second unit mounted to the center frame and including the means for igniting the ignitable material.

19. A hybrid inflator as defined in claim 17 wherein the outlet orifice is defined in a second unit mounted in the center frame.

20. A hybrid inflator as defined in claim 17 wherein the outlet orifice is defined in a second unit mounted in the center frame generally centrally along the length of the elongated housing.

21. A hybrid inflator as defined in claim 20 wherein the first unit includes a squib and pyrotechnic gas generant and defines an exit opening for releasing products of combustion of the gas generant material, and the second unit includes a baffle plate positioned between the exit opening and the outlet orifice.

22. A hybrid inflator as defined in claim 17 wherein the ignitable material for heating the pressurized gas is an essentially non gas-producing heating composition and the first unit also defines the outlet orifice positioned to provide a flow path adjacent the heating composition for delivering heated gas from the chamber.

23. A hybrid inflator as defined in claim 22 wherein the means for igniting the heating composition includes a squib and pyrotechnic gas generant positioned within the first unit.

24. A hybrid inflator as defined in claim 23 wherein the outlet orifice is defined between the heating composition and the pressurized gas.

25. A hybrid inflator as defined in claim 22 wherein the means for igniting the heating composition includes a squib and a pyrotechnic gas generant included in a second unit mounted to the housing.

26. A hybrid inflator comprising:
 A) an extruded metal center frame having a circumferential sidewall with first and second ends, the circumferential sidewall defining a central opening between the first and second ends, the center frame having a cross-section which is linearly uniform along the central opening providing the center opening with a substantially uniform diameter;
 B) first and second end caps, each end cap having a tubular sidewall and an open and a closed end, the open ends of the first and second end caps respectively secured to the first and second ends of the center frame to provide a closed chamber storing a pressurized gas;

C) the circumferential sidewall of the center frame further defining at least one opening therethrough; and D) at least one unit mounted extending through the circumferential sidewall of the center frame and extending into the closed chamber and including ignitable material for heating the stored gas by contact with the ignitable material and the products of combustion thereof and exiting heat expanded gas from the closed chamber.

* * * * *

UNITED STATES PATENT AND TRADEMARK OFFICE
CERTIFICATE OF CORRECTION

PATENT NO. : 5,533,751
DATED : July 9, 1996
INVENTOR(S) : Kort et al.

It is certified that error appears in the above-indentified patent and that said Letters Patent is hereby corrected as shown below:

```
Col. 5, Ln. 26, correct "FIGS. 6 and" to read
    -- FIGS. 6 and 7 -- .
Col. 9, Lns. 25-26, correct "solid the baffle plate" to read
    -- the solid baffle plate -- .
```

Signed and Sealed this

Tenth Day of February, 1998

Attest:

BRUCE LEHMAN

Attesting Officer     *Commissioner of Patents and Trademarks*